(12) United States Patent
Seebacher et al.

(10) Patent No.: US 12,730,290 B2
(45) Date of Patent: Sep. 8, 2026

(54) METHOD FOR ACCELERATED MICROSCOPY OF LARGE SAMPLES

(71) Applicant: Till I.D. GmbH, Planegg (DE)

(72) Inventors: Christian Seebacher, Gräfelfing (DE); Andreas Deeg, Munich (DE); Rainer Uhl, Munich (DE)

(73) Assignee: TILL I.D. GmbH, Planegg (DE)

( * ) Notice: Subject to any disclaimer, the term of this patent is extended or adjusted under 35 U.S.C. 154(b) by 806 days.

(21) Appl. No.: 17/922,375

(22) PCT Filed: Apr. 27, 2021

(86) PCT No.: PCT/EP2021/060945

§ 371 (c)(1),
(2) Date: Oct. 31, 2022

(87) PCT Pub. No.: WO2021/219613

PCT Pub. Date: Nov. 4, 2021

(65) Prior Publication Data

US 2023/0168479 A1 Jun. 1, 2023

(30) Foreign Application Priority Data

Apr. 30, 2020 (DE) ..................... 10 2020 111 786.8

(51) Int. Cl.
*G02B 21/06* (2006.01)
*G02B 21/00* (2006.01)

(52) U.S. Cl.
CPC ..... *G02B 21/0036* (2013.01); *G02B 21/0032* (2013.01); *G02B 21/008* (2013.01)

(58) Field of Classification Search
CPC ........................... G02B 21/00; G02B 21/0004; G02B 21/0008; G02B 21/0012; G02B 21/0016;

(Continued)

(56) References Cited

U.S. PATENT DOCUMENTS 6,333,499 B1 * 12/2001 Sato .................... G01N 21/6452
250/234
9,684,159 B2 * 6/2017 Van Dijk ........... G01D 5/34746
12,265,211 B2 * 4/2025 Uhl ...................... G02B 21/008

FOREIGN PATENT DOCUMENTS

CN 102854615 A 1/2013
WO WO 2013/184758 A2 12/2013

(Continued)

OTHER PUBLICATIONS

Office Action for DE1020201117868 issued by the German Patent and Trade Mark Office; mailing date of Jan. 30, 2023.

(Continued)

*Primary Examiner* — Thong Q Nguyen
(74) *Attorney, Agent, or Firm* — Harness, Dickey & Pierce, P.L.C.

(57) ABSTRACT

A method for acquiring microscope-images of sample being larger than a field of view of a microscope, the method comprising creating a continuous relative movement between a sample and the microscope, wherein the optical axis of a microscope objective is substantially perpendicular to the vector of the relative movement, illuminating a part of the sample through the microscope objective, wherein the illuminated part of the sample is smaller than the field of view and forms an illumination slit, moving the illumination slit in a scanning direction across the field of view, and detecting light from the sample collected by the microscope objective, wherein the sample is moved in the same direction as the scanning direction or in a direction perpendicular to the scanning direction while the illumination slit is moved across the field of view.

17 Claims, 6 Drawing Sheets

(58) Field of Classification Search

CPC .............. G02B 21/002; G02B 21/0024; G02B 21/0026; G02B 21/0032; G02B 21/0036; G02B 21/0044; G02B 21/0048; G02B 21/0052; G02B 21/0076; G02B 21/0088; G02B 21/02; G02B 21/06; G02B 21/24; G02B 21/26; G02B 21/36; G02B 21/361; G02B 21/365; G02B 21/366

USPC .................................................. 359/368–398

See application file for complete search history.

(56) References Cited

FOREIGN PATENT DOCUMENTS

| | | |
|---|---|---|
| WO | WO 2013/184758 A3 | 12/2013 |
| WO | WO 2013/184762 A1 | 12/2013 |
| WO | WO 2020/038754 A1 | 2/2020 |

OTHER PUBLICATIONS

International Search Report and Written Opinion for PCT /E P2021 /060945; mailing date of Aug. 5, 2021.

E. Mei, et al. "A Line Scanning Confocal Fluorescent Microscope Using a CMOS Rolling Shutter as an Adjustable Aperture" Journal of Microscopy, vol. 247 pp. 269-276, Feb. 29, 2012.

Yang, et al. "Rapid Imagine of Large Tissues using High-Resolution Stage-Scanning Microscopy" Biomedical Optics Express 1867, Apr. 23, 2015.

* cited by examiner

Field of view camera
Slit-illumination
Sample
Frame-1
Frame-2
Frame-3
shear correction
shear correction
shear correction
Frame-1
Frame-1
Frame-2
Frame-1
Frame 2
Frame-3

METHOD FOR ACCELERATED MICROSCOPY OF LARGE SAMPLES

FIELD OF DISCLOSURE

The present disclosure relates to the field of microscopy. More particularly, a microscope-image of a sample being larger than a field of view of a microscope. Moreover, the disclosure relates to a computer program product and a computer readable medium. The computer readable medium comprises computer-executable instructions, which, when executed by the respective device(s) being equipped with processors causing the device(s) to perform the method steps of the disclosure on the respective device.

BACKGROUND

The field of view of a microscope depends on its magnification and thus on the magnification of the used objective lens. In a camera-based microscope the dimensions of the sensor cause additional constraints, as the (usually) rectangular needs to fit into the circular area imaged by the microscope optics. In case of microscope-imaging with the help of a camera placed in the image-plane of a microscope, the chip-dimensions are meant whenever reference is made to the field of view of a microscope or the chip dimensions may be considered as equivalent to the field of view of a microscope.

Whenever the goal is to map samples larger than the field of view of a microscope, for example in screening applications, where sample areas are grouped on a microtiter plate in form of wells and where each well exceeds the area captured by a single camera-frame, examining the whole microtiterplate usually requires moving of the sample and capturing multiple images. These images are then stitched together in order to generate a composite image of the entire sample. Moving the sample in a way that the individual images partially overlap facilitates the generation of the composite image. However, the higher the magnification, the more images need to be taken and the more often the sample needs to be accelerated, stopped and measured. For example: With a 60× objective and a camera chip-size of 13.2×13.2 mm, mapping a 96 well-plate requires 76.000 stop&go cycles! Even with the best possible equipment this takes several hours.

Patent publication WO/2020/038754 teaches a concept for capturing images from a continuously moving sample resulting in unilaterally compressed images of the sample, whereby a slit-shaped illumination pattern, oriented perpendicularly to the sample-movement, is synchronized with a slit-shaped detection window of a camera and both move in opposite direction of the sample movement. The extent to that the resulting image is compressed in scan-direction depends on how fast the sample moves in one and the slit-illumination in the opposite direction. For example, if both move at identical speed, this leads to a twofold unilateral compression of the image. When matched by an equivalent binning of two pixels in direction perpendicular to the scan- and slit-movement the result is a symmetrical, twofold reduced "virtual magnification" of the acquired image. This reduced resolution is volitional, as the aim is to replace the conventional stop&go approach, that usually comprises switching to a low magnification objective, obtaining an overview in the usual stop&go fashion and subsequently switching to a high magnification objective for revisiting areas of interest.

Accordingly, there is a need to enhance the possibilities for acquiring a microscope-image of a sample being larger than a field of view of a microscope, e.g. to overcome the limitation with respect to speed and accuracy.

SUMMARY

The present disclosure relates to a method and system for microscopic imaging of samples that are larger than the field of view of a microscope. The method enables high-speed image acquisition without the need for stop-and-go motion or image stitching. A continuously moving sample is illuminated by a slit-shaped illumination pattern, and the illumination and detection are synchronized to compensate for any image deformation caused by motion.

The disclosure further relates to a microscope device and a computer-readable medium configured to perform this method. The invention provides an efficient and precise way to acquire large-area microscope images with high resolution and reduced acquisition time. Details of various embodiments, including control logic, synchronization, and correction procedures, are described in the section of Detailed Description.

Figure 1:
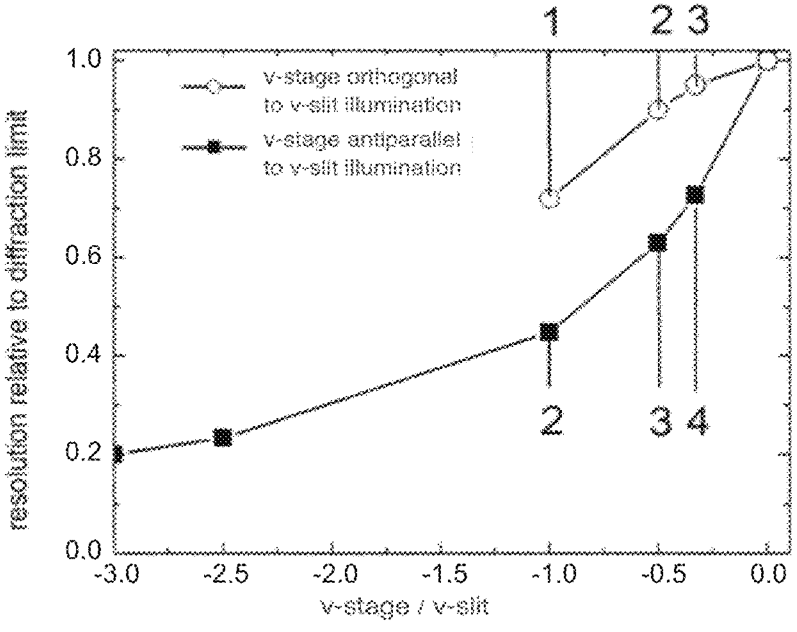
FIG. 1 shows how resolution is reduced with increasing stage/sample movement speed relative to the speed of the illumination slit when both move perpendicular or antiparallel.

The accompanying drawings illustrate exemplary embodiments of the disclosure and serve to explain, by way of example, the principles of the disclosure.

DETAILED DESCRIPTION

The present disclosure aims at scanning extended areas (larger than the field of view of the camera) of a microscopic fluorescent sample, without stitching tiles acquired in the usual stop&go procedure to overcome at least some of the limitations of the prior art. This is achieved by exciting a continuously moving sample with a slit-shaped illumination, that repeatedly moves over said sample as described below. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Accordingly, the present disclosure provides one or more solutions to the problems and disadvantages of the background art. Other technical advantages of the present disclosure will be readily apparent to one skilled in the art from the following description and claims. Accordingly the present disclosure is directed to a method and a device for scanning extended areas (larger than the field of view of the camera) of a microscopic fluorescent sample, without stitching tiles acquired in the usual stop&go procedure according to the appended claims by exciting a continuously moving sample with a slit-shaped illumination, which repeatedly moves over said sample. As this disclosure relates to microscope-imaging with the help of a detector such as a camera placed in the image-plane of a microscope, its chip-dimensions, preferably rectangular chip dimensions are meant whenever reference is made to the field of view of the microscope.

In accordance with an aspect of the present disclosure there is provided a method for acquiring a microscopic image of a sample being larger than a field of view of a microscope, the method comprising:

- creating, by a control unit, a continuous relative movement between a sample and the microscope, wherein the optical axis of a microscope objective is substantially perpendicular to the vector of the relative movement;
- illuminating, by a light source controlled by the at least one control unit, a part of the sample through the microscope objective, wherein the illuminated part of the sample is smaller than the field of view and forms an illumination slit;
- moving, by a scanning unit controlled by the at least one control unit, the illumination slit in a scanning direction across the field of view; and
- detecting, by a detector controlled by the at least one control unit, light from the sample collected by the microscope objective;
- characterized in that the sample is moved in the same direction as the scanning direction or in a direction perpendicular to the scanning direction while the illumination slit is moved across the field of view by the scanning. Creating a continuous relative movement between a sample and the microscope is to be understood in the sense of the present disclosure that either the sample is moved,
- e.g. using a motorized stage controlled by the at least control unit and the microscope is stationary such that the sample is moved relative to the microscope or that the sample is stationary and the microscope is moved. Accordingly, instead of moving the sample relative to the microscope, one can, in principle, also move the microscope relative to the sample. Given that the microscope is usually a much bulkier instrument than stage and sample taken together, a moving stage is the preferred embodiment of the disclosure. Note that in case the microscope is moved relative to the sample the later used terms for scanning directions are reversed.

Further, the term substantially perpendicular is to be understood that the vector of the relative movement between the sample and the microscope, irrespective whether the sample is moved with respect to the microscope or the microscope is moved with respect to the sample, is within a range of +/−10° to a perpendicular to the optical axis of the microscope, preferably within a range of +/−5° to a perpendicular to the optical axis of the microscope. The vector of movement between the sample and the microscope is to be understood to describe the movement of the sample with respect to the microscope, irrespective to that part, i.e. the sample, the microscope or both, is actively moved.

A light source in meaning of the present disclosure may be any type of light source known by the person skilled in the art suitable for evoking fluorescence in a sample and depending on the characteristics of the sample to be investigated.

The at least one control unit is at least one computer system configured to perform one or more steps of one or more methods described or illustrated herein. In particular embodiments, one or more computer systems provide functionality described or illustrated herein. In particular embodiments, software running on one or more computer systems performs one or more steps of one or more methods described or illustrated herein or provides functionality described or illustrated herein. The control unit may include a storage for data or instructions. As an example, and not by way of limitation, storage may include a hard disk drive (HOD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to computer system, where appropriate. In particular embodiments, storage is non-volatile, solid-state memory. In particular embodiments, storage includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage may include one or more storage control units facilitating communication between a processor of the control unit and storage, where appropriate.

In an embodiment of the present disclosure the method may further comprise correcting the acquired microscopic image to compensate for 1-dimensional image deformations or for 2-dimensional image deformations caused by the continuous movement of the sample. In the case of the sample being moved in the same direction as the scanning direction, the correction may comprise image contraction in scanning direction, the extent of contraction depending on the relative speed of the sample movement and the movement of the slit of the slit illumination. Alternatively, in the in the case of the sample being moved in a direction perpendicular to the scanning direction, the correction comprises image shearing perpendicular to the scanning direction, the extent of shearing depending on the relative speed of the sample movement and the movement of the slit of the slit illumination.

In another embodiment of the present disclosure, the detector may be a camera, that may be controlled by the at least one control unit. The camera used by the disclosure is preferably controlled in such a manner that the image acquisition frame-rate is at least approximately synchronized with the time it takes the slit-illumination to move from a starting position at one end of the detector to an opposite end of the detector. Alternatively, the camera may be controlled in such a manner that the image acquisition frame-rate is independent from the time it takes the slit-illumination to move from a starting position at one end of the detector to an opposite end of the detector. Alternatively or in addition thereto, the detector is controlled by the at least one control unit in such a manner that at a time only a strip-like zone of the detector is activated to detect light, with the activated zone being moved across the detector in at least approximate synchronism with the movement of the image of the illumination slit on the detector so as to keep the image of the illuminated part of the sample in the center of the activated zone of the detector and wherein the active zone is moved from a starting position at one end of the detector to an opposite end of the detector.

In yet another embodiment of the present disclosure the sample may be illuminated using structured illumination, that is with a spatially modulated slit-illumination, that has to pass a sample region several times before each excitation volume has been illuminated at least once.

In a further embodiment of the method in the sample is moved in the same direction as the scanning direction, the sample may be moved at a speed that amounts to 5% to 50% of the speed of the movement of the illumination slit, preferably at a speed that amounts to (i) 12.5%, (ii) 25%, (iii) 33% or (iv) 50% of the speed of the movement of the illumination slit. Thus, each sample position is imaged 7×, 3×, 2× or 1× respectively in a single sweep. A sweep in the meaning of the present disclosure is the execution of continuous relative movement, without stop and, optionally, without change of direction, between the sample and the microscope, irrespective whether the sample is moved with respect to the microscope or the microscope is moved with respect to the sample, until the entire, predefined or user selected area of the sample has been brought in the field of view of a microscope. In further embodiments of the present disclosure the speed of the movement of the sample with respect to the speed of the movement of the illumination slit may be adjusted in order to compensate for delays caused by the time it takes the illumination slit to return to its initial position. These hardware specific corrections to the above mentioned movement speed ratios are also within the scope of the present disclosure.

In yet another embodiment of the method in which the sample is moved in a direction perpendicular to the scanning direction the sample may be moved at the same speed as the speed of the movement of the illumination slit. In embodiments, the sample may be moved at a speed that amounts (i) 100%, (ii) 50%, or (iii) 33% of the speed of the movement of the illumination slit. Each sample position can be imaged 1×, 2× or 3× respectively in a single sweep. In further embodiments of the present disclosure the speed of the movement of the sample with respect to the speed of the movement of the illumination slit may be adjusted in order to compensate for delays caused by the time it takes the illumination slit to return to its initial position.

In another embodiment of the present disclosure at least one, preferably each position of the sample may be scanned multiple times, preferably 7 times (i), 3 times (ii), 2 times (iii) or once (iv).

In yet another embodiment of the present disclosure in at least one position of the sample is scanned multiple time, at least one parameter of the scanning method may be changed between repeated scanning events of the scanned position. Parameters that may be changed may be selected from but not limited to, type of illumination or focus position. The type of illumination according to the present disclosure may comprise illumination pattern, such as e.g. structured light illumination, illumination wavelength and/or combinations of illumination wavelengths, or illumination intensity.

In another embodiment of the present disclosure, the speed of the movement of the sample with respect to the speed of the movement of the illumination slit may be adjusted in order to compensate for delays caused by the time it takes the illumination slit to return to its initial position. The adjustment may be mathematically.

In yet another embodiment of the present disclosure the scanning unit may be controlled by the at least one control unit such that, when the activated zone on the detector reaches the end of the length of the detector, illumination of the sample by the light source is interrupted while the illumination slit is moved back to the starting position so as to complete one scanning cycle. In addition, scanning cycle may be repeated while the sample is moved until a desired area of the sample has been covered by the illumination slit, wherein an image of the sample or of an area or portion of the sample is created in each scanning cycle. Images of an area or portion of the sample may at least partially overlap with images created from adjacent areas or portions of the sample. Created images may be stitched together to create a composite image of the entire area of the sample scanned. The compensation for 1-dimensional image deformations or for 2-dimensional image deformations caused by the continuous movement of the sample may be performed on the bases of the images acquired during individual scanning cycles or on the basis of the composite image.

In an aspect the present disclosure is further directed to a microscope device comprising: a microscope objective, at least one control unit, a sample stage for holding a sample, means for creating a relative movement between a sample and the microscope, a light source, an illumination slit-forming element, a scanning unit, and a detector, wherein the device is configured to perform the method according to the different embodiments of the present disclosure as described above as well as in the detailed description. The means for creating the relative movement in meaning of the present disclosure may be a motorized stage holding the sample and being controlled by the at least control unit to move the sample relative to the microscope that is kept stationary. Alternatively, the means for creating the movement may move the microscope while the sample is kept stationary on the stage. Alternatively, the movement may be created by a combination of a motorized stage moving the sample and a additional means for moving the microscope.

The at least one control unit is at least one computer system configured perform one or more steps of one or more methods described or illustrated herein. In particular embodiments, one or more computer systems provide functionality described or illustrated herein. In particular embodiments, software running on one or more computer systems performs one or more steps of one or more method described or illustrated herein or provides functionality described or illustrated herein. The control unit may include a storage for data or instructions. As an example and not by way of limitation, storage may include a hard disk drive (HOD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to computer system, where appropriate. In particular embodiments, storage is non-volatile, solid-state memory. In particular embodiments, storage includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage may include one or more storage control units facilitating communication between a processor of the control unit and storage, where appropriate.

In aspect the present disclosure is further directed to a non-transitory computer readable medium comprising instructions thereon that when executed on a processor cause a microscope device according to the disclosure as described above and in the detailed description to perform the method according to the different embodiments of the present disclosure as described above as well as in the detailed description. A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The present disclosure will now be described more fully hereinafter with reference to the accompanying figures, in which preferred embodiments are shown. The method, however, may be embodied in many different forms and should not be construed as limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

The present disclosure also aims at mapping large sample-areas with a continuously moving sample to acquire a fully resolved microscopic image with the final desired magnification without sacrificing resolution in scan-direction. To this end the direction of a continuously moving sample is made not antiparallel to the movement of a slit-shaped illumination pattern. In one embodiment of the present disclosure, the sample is continuously moved perpendicular to the scanning direction. In another embodiment, the sample is moved in parallel to, i.e. in the same direction as the scanning direction.

FIG. 1 shows how resolution drops with increasing scan-speed relative to the speed of the illumination slit for the case when both move in antiparallel fashion as known from methods for acquiring images of continuously moving samples according to the prior art. As outlined above, in the event that slit-illumination and stage move at equal speed, image compression and motion blur together cause a more than twofold resolution drop in scan-direction, corresponding to a (unidirectional) virtual magnification of 50% of the nominal objective magnification.

However, as also shown in FIG. 1, if the sample stage and the slit-illumination move with equal speed perpendicularly to each other, the unilateral resolution-drop is 25% only, instead of 45%. Thus, a 40× objective can effectively operate as a virtual 30× objective with very little resolution loss, and if the stage moves even slower, the virtual magnification remains even closer to the nominal one while the resolution-loss decreases further. When the stage movement is slowed to ⅓ the speed of the slit-illumination, the resolution in scan-direction is nearly unaffected, dropping less than 5%. Therefore, given the speed of modern high-speed cameras, one can capture images from an illumination slit moving over the sample at a speed of 30 mm/s, and, since image stripes are recorded from a sample moving at one-third of this speed, high-resolution images can be acquired in a “lawn-mower fashion”, that is, by scanning back and forth in adjacent, partially overlapping lines across the sample area without stop-and-go movement and without significant loss of resolution.

Figure 2:
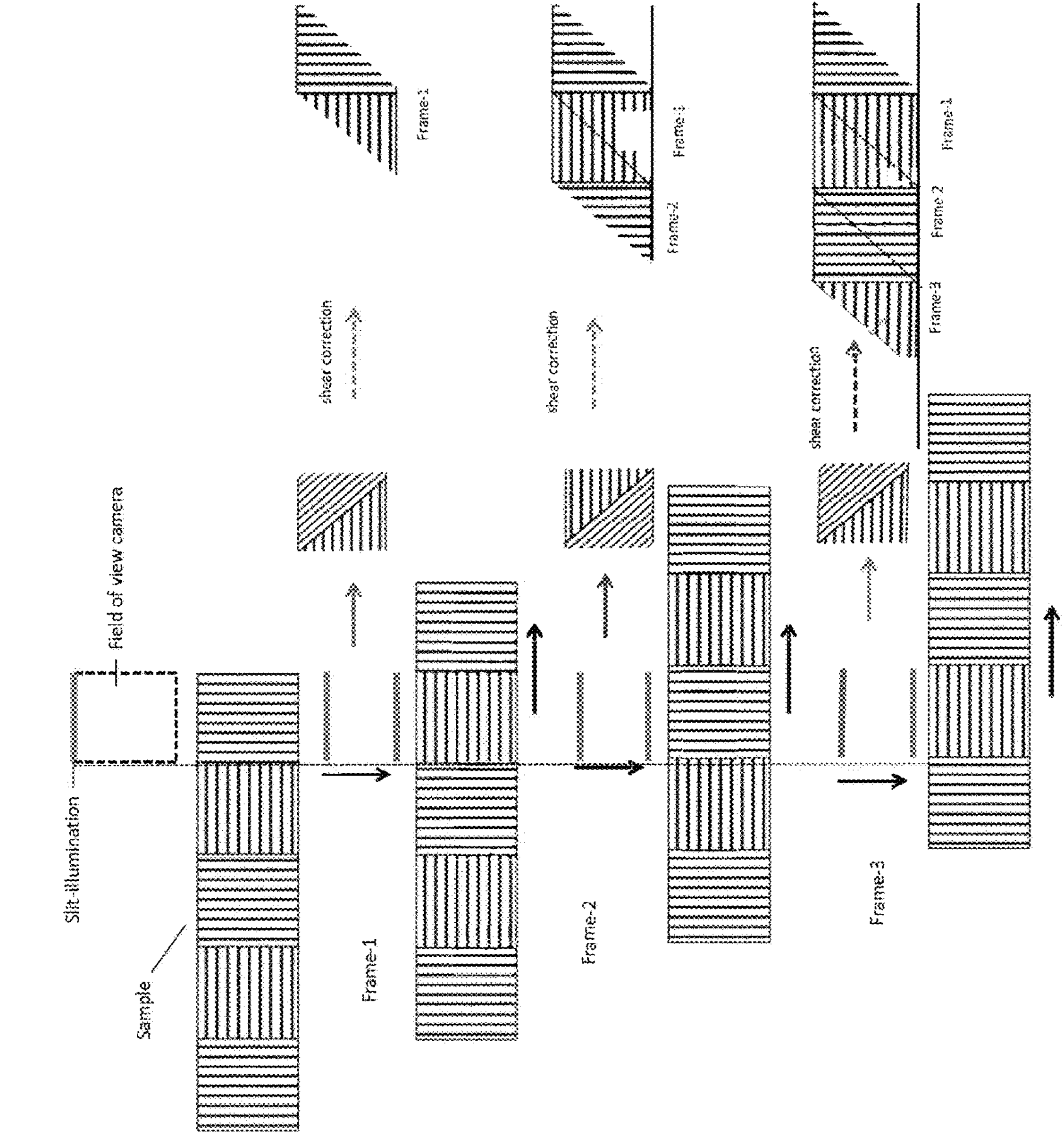
FIG. 2 outlines image acquisition and correction procedure for perpendicular movement of sample and illumination.

However, images acquired in accordance with embodiments of the present disclosure are distorted in 2-dimensions and need to be straightened mathematically as illustrated schematically in FIG. 2. The corresponding correction of the acquired microscopic image to compensate for 2-dimensional image deformations caused by the continuous movement of the sample can be performed directly after image acquisition or can be done subsequently.

Figure 3:
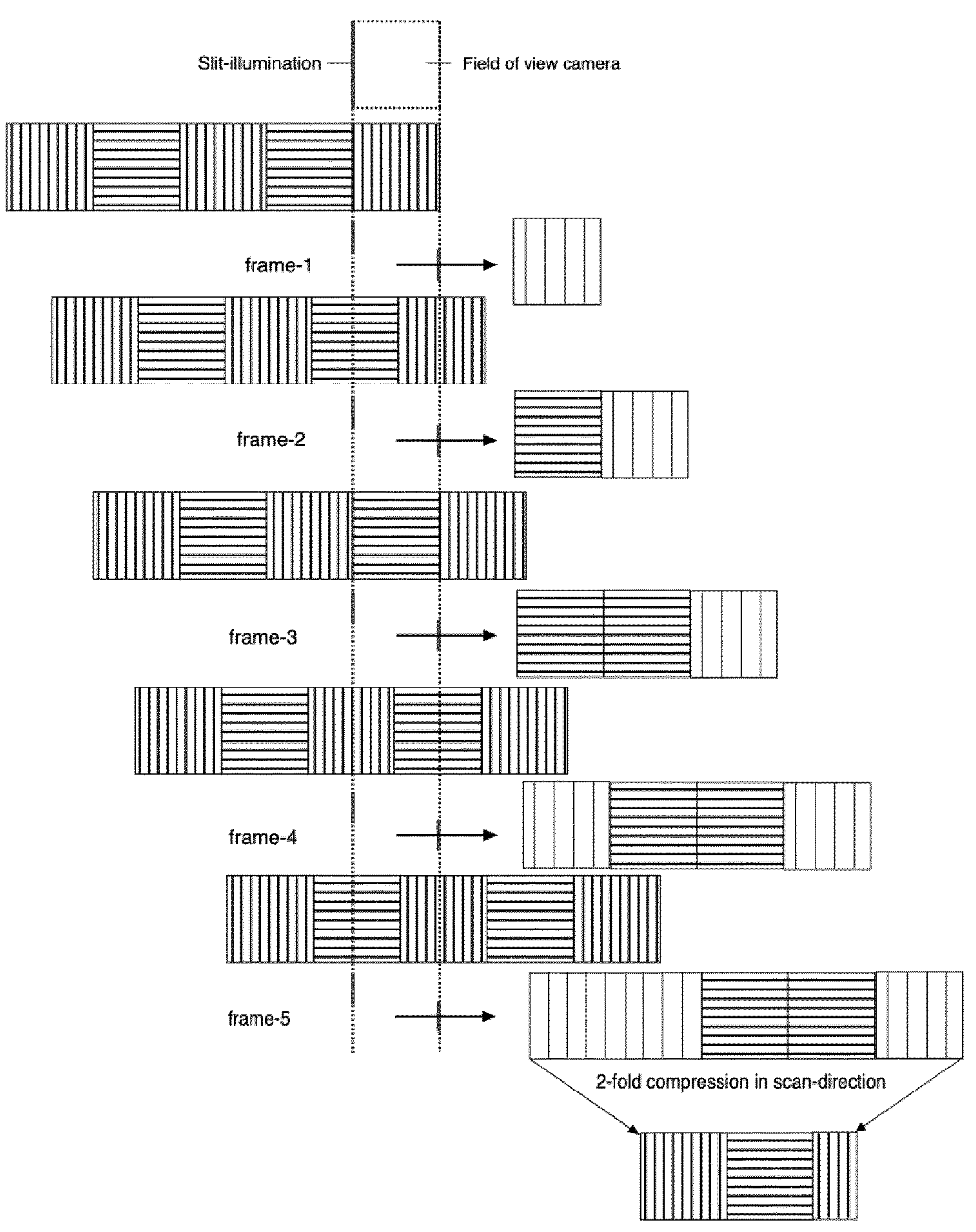
FIG. 3 outlines image acquisition and correction procedure for movement of sample and illumination in parallel.

Another embodiment of the disclosure is depicted schematically in FIG. 3. In this embodiment, the sample is moved in parallel to, i.e. in the same direction as the slit-illumination and the slit-illumination is set back to its starting position on the camera-chip each time it has swept over the field of view of the camera. In an example making use of the embodiment, the illumination slit moves twice as fast as the sample, thus each camera-exposure captures an image-field corresponding to 50% of the field of view of the camera. As a result of the movement of the sample with respect to the illumination slit, the acquired image is stretched out (in this example twofold) in scan-direction and hence needs to be compressed (in the given example twofold) in order to establish the original magnification. The corresponding correction of the acquired microscopic image to compensate for 1-dimensional image deformations caused by the continuous movement of the sample can be performed directly after image acquisition or can be done subsequently.

It has to be noted that the numeric values given in the above embodiment is an idealization, as assumes a negligible fly-back time for the illumination-slit scanner. To accommodate a realistic fly-back time, one has to decrease the speed of the moving sample accordingly, otherwise one will miss fractions of the sample. Thus, to scan 50% of the camera field of view takes the time to complete a camera-sweep plus the flyback-time. Respective hardware specific adaptations fall also under the scope of the present disclosure.

Figure 4:
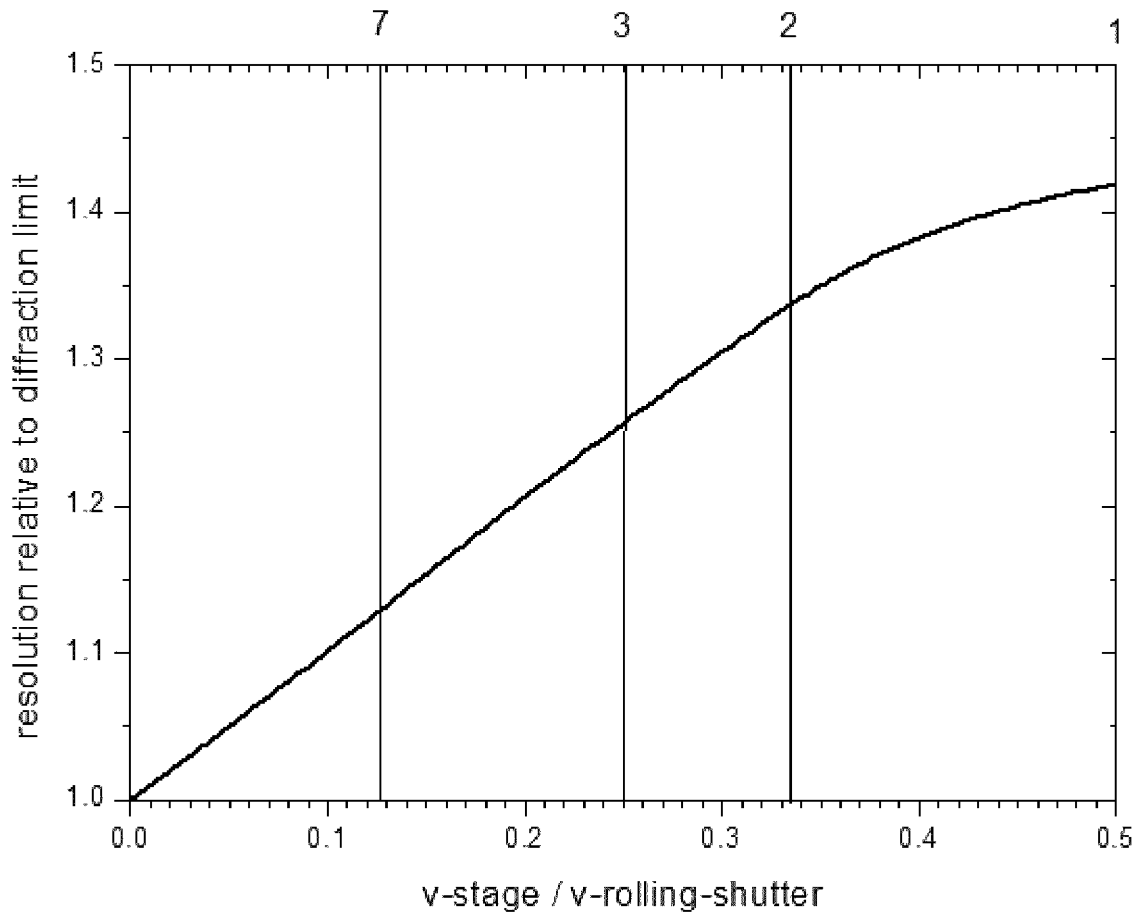
FIG. 4 shows the achieved resolution in scan-direction as a function of the speed of the illumination slit relative to the sample speed.

FIG. 4 plots the achieved resolution in scan-direction as a function of the speed of the illumination slit relative to the sample speed with respect to the embodiment of the present disclosure in that the sample is moved in parallel to, i.e. in the same direction as the slit-illumination. In FIG. 4 zero means a stationary sample, and 0.5 means that the sample moves at half the speed of the slit-illumination. Ratios >0.5 yield dis-continuous images with missing zones.

The ordinate plots the unilateral resolution in scan-direction, whereby 1 means diffraction limited resolution, whereas values >1 denote a resolution enhancement. As the achieved resolution depends on the time a given sample-element remains within the illumination slit during the scan, it not only depends on the relative speed of sample movement, but also on the width of the illumination-slit. The values shown in FIG. 3 show the maximally obtained resolution using a diffraction-limited slit-width.

It as to be noted that in this variant of the disclosure, in the sample is moved in parallel to, i.e. in the same direction as the slit-illumination, the moving sample never degrades resolution, instead it even provides a (unilateral) resolution increase, that is maximal (2-fold) when the sample moves at the maximal allowable speed (½ of the speed of the slit illumination), the limit beyond that the resulting image becomes discontinuous.

As outlined above, the underlying principle of the disclosure is that a signal, especially a fluorescent signal from a given fluorophore in a continuously moving sample is excited only during the short time when the moving slit-illumination and the moving sample-element overlap, and emitted photons are captured by the detector only during this short time of spatial overlap. However, in cases where the slit-illumination undergoes scattering in focal-planes above and below the focal-plane of the objective, the camera will collect background signal from fluorophores, that are not directly illuminated, and this, in turn, will cause image-blurring. This detrimental effect is reduced by unidirectionallly restricting the active area of the camera to form an active window, that follows the slit illumination while it scans from one end of the field of view of the camera to the other end. The smaller this active window is made, the fewer emission photons originating from not directly illuminated regions can contribute to the image hence the better blurring is suppressed.

The merit of the disclosure over the current state of the art is outlined by the following experiment:

Goal is to scan 96 wells of a micro-plate at diffraction-limited (using a 40× objective with NA 1.25 and Nyquist-sampling at 525 nm) pixel resolution of 107 nm. Using, for example, a rolling shutter chip of 4.432×2.368 pixel with 4.6 μm pixel size and a frame-rate of 120 fps (as provided, for example by a Fairchild LTN 4323), one can move the sample at 15.2 mm/s and thus acquire an image stripe of 474 μm width and 110 mm length in 7.2 s. 16 such stripes are needed for scanning a single row of wells, and eight such rows make up a whole plate. Thus, the disclosure enables to scan a whole micro-plate in 8×16×7.2 s, that is little more than 16 minutes. Covering the same area by stitching single image-tiles acquired with the conventional stop&go approach according to the prior art would require to accelerate and stop ca. 45.000 times. Even with the fastest stages one maximally visits 6 position/s, thus reading the whole micro-plate in conventional fashion would take at least two hours, that is 7.5× longer.

As shown in FIG. 4, image-resolution is enhanced in scan-direction beyond the nominal resolution of the orthogonal direction. It can increase up to 2-fold in the direction of the scan-axis, while it remains unchanged along the slit-axis. The concept of structured illumination microscopy (SIM), using a spatially modulated slit-illumination as in the prior art would allow to increase resolution along this axis, too, and would provide a further increased sectioning beyond slit-confocality.

Figure 5:
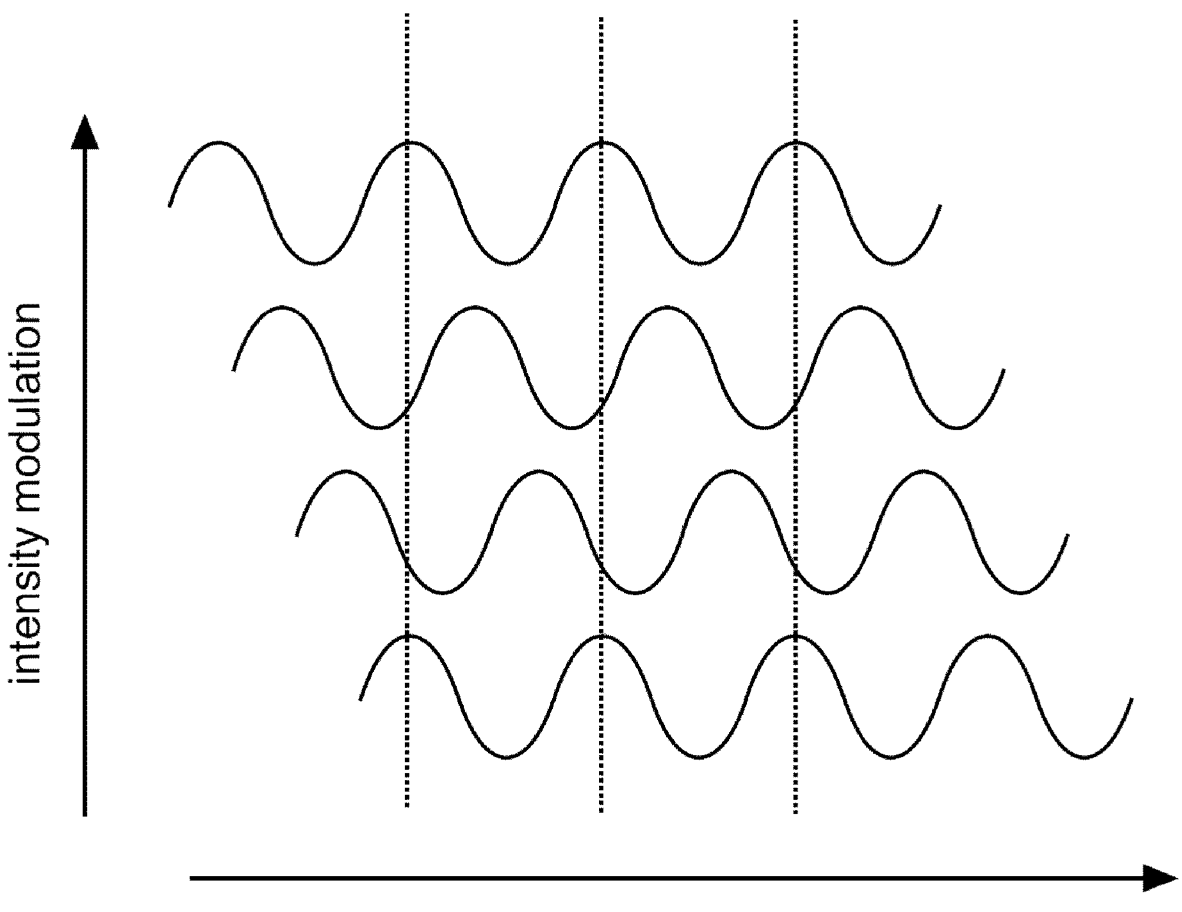
FIG. 5 schematically shows the use of a spatially modulated slit-illumination in embodiments of the present disclosure.

FIG. 5 schematically illustrates the illumination and image acquisition principle used in the present disclosure. The illumination pattern is intensity-modulated along the slit direction, for example with a fill factor of about 50%, and is moved continuously over the sample while the sample itself is translated perpendicularly to the slit. The relative movement of the illumination slit and the sample results in the recording of a continuous image stripe. To enable optical sectioning by structured illumination, three such image stripes are recorded from the same sample region, each shifted by one-third of a modulation period relative to the previous one. These three stripes represent three phase images, i.e., three images captured at different relative phase positions of the structured illumination pattern. After recording all three phase images, a computational reconstruction is carried out in which the data are combined according to known structured-illumination algorithms to yield a sectioned image with improved contrast and resolution in the direction of the modulation. By scanning the sample continuously from one end of the desired region to the other, then phase-shifting the structured illumination pattern by one-third of a modulation period and scanning in the reverse direction, and repeating this process for all three phase positions, a complete set of phase-shifted image stripes is obtained. These can then be combined to produce an image lane featuring enhanced optical sectioning and increased resolution beyond that achievable with conventional slit-confocal imaging.

Thus, in the example described above, the continuous structured illumination microscopy (SIM) approach enables the acquisition of a complete, sectioned SIM image of an entire microplate in a little more than half an hour, which is approximately four times faster than a conventional slit-confocal stop-and-go scanning approach.

As outlined in FIG. 4, a stage-speed as fast as 50% of the speed of the illumination slit provides gap-less image stripes composed of subsequent exposures. If the stage-speed is lowered to ⅓ of the slit-speed, each emitting area will be revisited twice, if it is lowered to ¼ of the slit-speed, each emitting area will be revisited three times and so forth. Thus the above three exposures for a SIM image could also be achieved by lowering the scan-speed such that the emission-slit passes every area of the sample three times, with an orthogonal phase-shift in-between each of the three passages. Compared to the above "lawn-mower" approach, where long stripes are recorded between turning points, this affords a 1.5× faster scan, as the scan-speed needs to be reduced twice only in order to obtain three phase-images. However, the resulting resolution improvement drops from 1.4× to 1.25×. Following the same reasoning, one could also acquire SIM-images composed from 7 phase-images by reducing the stage-speed to ⅛ of the speed of the slit-illumination, thereby revisiting each sample area 7 times.

The above feature of the disclosure, namely that areas of the sample can be imaged several times in a single, uninterrupted scan, i.e. during a single sweep can be applied for applications other than SIM, too. For instance, (i) one can change the excitation wavelength of the illumination-stripe between imaging events of the same area or at the same position of the sample in order to obtain a multicolor image in a single sweep, (ii) one can change the focal-plane between imaging events of the same area or at the same position of the sample so as to acquire an image stack in a single sweep, or (iii) one can use an intentionally tilted sample plane, that automatically yields images taken at as many focal planes as there are imaging events of the same area or at the same position of the sample.

Figure 6:
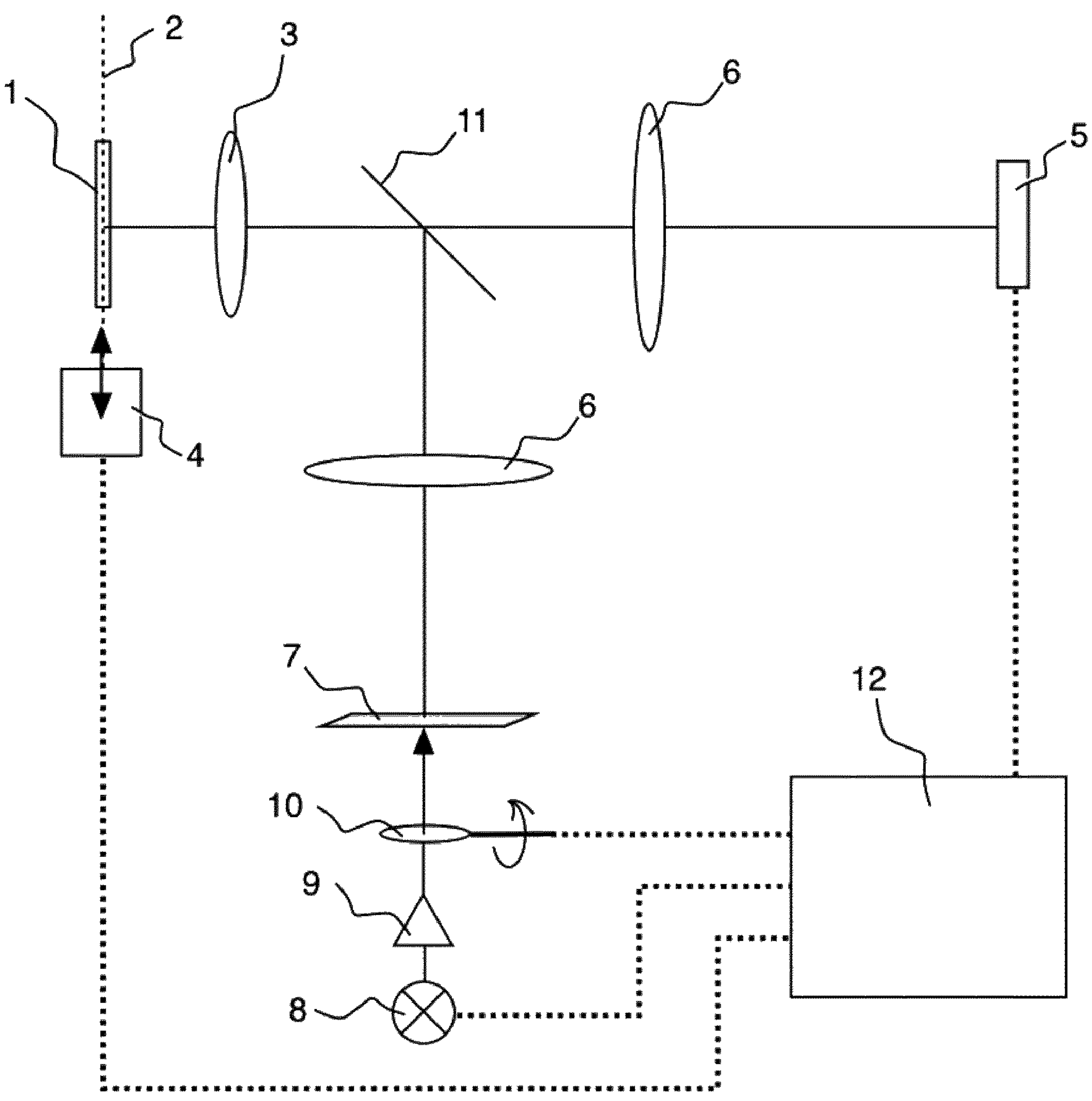
FIG. 6 shows a schematic overview of an microscope according to the disclosure.

FIG. 6 shows a schematic overview of a microscope according to the disclosure suitable to perform the method according to the disclosure. The microscope comprises: A sample (1), that is placed and held in the focal-plane (2) of a microscope objective (3), and can be moved continuously and with steady speed by a stage (4). The stage can move orthogonally to the chip-coordinates of an area detector or camera (5), on, after passing the objective (3) and a tube-lens (6), an image of the sample (1) is recorded. The fluorescence image is elicited by a slit-shaped illumination (7), generated by a light-source (8) and a slit-forming optical element (9), such as a Powell-lens. The illumination is scanned over the sample with the help of a deflecting element (10), that forms part of the scan unit and moves the slit-shaped illumination (7) strictly parallel to one of the movement axes of the stage (4). The illumination and emission beams are combined by means of a suitable dichroic element (11). At least one control-unit (12) synchronizes the stage (4), camera (5), light-source (8) and scan-unit and is further configured to perform the method described above.

In particular embodiments, the at least one control unit is at least one computer system configured perform one or more steps of one or more methods described or illustrated herein. In particular embodiments, one or more computer systems provide functionality described or illustrated herein. In particular embodiments, software running on one or more computer systems performs one or more steps of one or more methods described or illustrated herein or provides functionality described or illustrated herein. The control unit may include a storage for data or instructions. For example, and not by way of limitation, storage may include a hard disk drive (HOD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to computer system, where appropriate. In particular embodiments, storage is non-volatile, solid-state memory. In particular embodiments, storage includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 96 taking any suitable physical form. Storage may include one or more storage control units facilitating communication between processor and storage, where appropriate. Where appropriate, storage may include one or more storages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an method or device or a component of an device or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for acquiring a microscope-image of a sample being larger than a field of view of a microscope as seen by a camera, the method comprising:

creating a controlled continuous relative movement between the sample and the microscope, wherein an optical axis of a microscope objective is substantially perpendicular to a vector of a relative stage-movement;

illuminating, by a light source controlled by at least one control unit, a fraction of the field of view of the microscope through the microscope objective, wherein an illuminated part of the sample is smaller than the field of view and forms an illumination slit on the sample;

moving, by a scanning unit controlled by the at least one control unit, the illumination slit in a scanning direction across the field of view; and detecting, by a detector controlled by the at least one control unit, light from the sample collected by the microscope objective, wherein the sample is moved in a same direction as the scanning direction or in a direction perpendicular to the scanning direction while the illumination slit is moved across the field of view by the scanning unit.

2. The method of claim 1, further comprising:

correcting the acquired microscope-image to compensate for 1-dimensional image deformations or for 2-dimensional image deformations caused by the controlled continuous relative movement of the sample.

3. The method according to claim 2, wherein in a case of the sample being moved in the same direction as the scanning direction, the correcting the acquired microscope-image comprises image contraction in the scanning direction, an extent of the image contraction depending on a relative speed of the sample movement and the movement of the illumination slit.

4. The method according to claim 2, wherein in a case of the sample being moved in the direction perpendicular to the scanning direction, the correcting the acquired microscope-image comprises image shearing perpendicular to the scanning direction, an extent of the image shearing depending on a relative speed of the sample movement and the movement of the illumination slit.

5. The method according to claim 1, wherein the detector is the camera, controlled by the at least one control unit in such a manner that an image acquisition frame-rate is at least approximately synchronized with a time it takes the illumination slit to move from a starting position at one end of the detector to an opposite end of the detector.

6. The method according to claim 5, wherein the detector is controlled by the at least one control unit in such a manner that at a time only a strip-like zone of the detector is activated to detect light, with the activated strip-like zone being moved across the detector in at least approximate synchronism with a movement of an image of the illumination slit on the detector so as to keep the image of the illuminated part of the sample in a centre of the activated strip-like zone of the detector and wherein the activated strip-like zone is moved from the starting position at the one end of the detector to the opposite end of the detector.

7. The method according to claim 5, wherein a speed of the movement of the sample with respect to a speed of the movement of the illumination slit is adjusted in order to compensate for delays caused by a time it takes the illumination slit to return to an initial position.

8. The method according to claim 1, wherein the sample is illuminated using structured illumination.

9. The method according to claim 1, wherein the sample is moved in the same direction as the scanning direction at a speed of 5% to 50% of a speed of the movement of the illumination slit, the speed being (i) 12.5%, (ii) 25%, (iii) 33% or (iv) 50% of the speed of the movement of the illumination slit.

10. The method according to claim 1, wherein the sample is moved in the direction perpendicular to the scanning direction at a speed of 5% to 100% of a speed of the movement of the illumination slit, to the speed being (i) 100%, (ii) 50%, or (iii) 33% of the speed of the movement of the illumination.

11. The method according to claim 1, wherein each position of the sample is imaged multiple times, preferably (i) 7 times, (ii) 3 times, or (iii) 2 times during a single sweep.

12. The method according to claim 11, wherein parameters of the imaging are changed between repeated imaging events of an imaged position, wherein the parameters include a type of illumination or a focus position.

13. The method to claim 1, wherein the scanning unit is controlled such that, when an activated zone on the detector reaches an end of a length of the detector, illumination of the sample by the light source is interrupted while the illumination slit is moved back to a starting position so as to complete one scanning cycle.

14. The method of claim 13, wherein the one scanning cycle is repeated while the sample is moved until a desired area of the sample has been covered by the illumination slit, wherein an image of a portion of the sample is created in each scanning cycle.

15. The method of claim 14, wherein images of portions of the sample partially overlap with images created from adjacent portions of the sample.

16. A microscope device comprising:

a microscope objective;

at least one control unit;

a sample stage for holding a sample;

a mechanism for creating a continuous relative movement between the sample and the microscope device;

a light source;

an illumination slit-forming element;

a scanning unit; and a detector;

the microscope device being configured to:

create, by the mechanism, the continuous relative movement between a sample and the microscope device; wherein an optical axis of the microscope objective is substantially perpendicular to a vector of the continuous relative movement;

illuminate by the light source controlled by the at least one control unit, a part of the sample through the microscope objective, wherein the illuminated part of the sample is smaller than a field of view and forms an illumination slit on the sample;

move, by the scanning unit controlled by the at least one control unit, the illumination slit in a scanning direction across the field of view; and detect, by the detector controlled by the at least one control unit, the illumination slit in the scanning direction across the field of view; and detect, by the detector controlled by the at least one control unit, light from the sample collected by the microscope objective, wherein the sample is moved in a same direction as the scanning direction or in a direction perpendicular to the scanning direction while the illumination slit is moved across the field of view by the scanning unit.

17. A non-transitory computer readable medium comprising instructions thereon which when executed on a processor cause a microscope comprising, a microscopic objective;

at least one control unit;

a sample stage for holding a sample;

a mechanism for creating a continuous relative movement between the sample and the microscope;

a light source;

an illumination slit-forming element;

a scanning unit; and a detector, to:

create, the mechanism, the continuous relative movement between the sample and the microscope, wherein an optical axis of the microscope objective is substantially perpendicular to a vector of the continuous relative movement;

illuminate, by the light source controlled by the at least one control unit, a part of the sample through the microscope objective, wherein the illuminated part of the sample is smaller than a field of view and forms an illumination slit on the sample;

move, by the scanning unit controlled by the at least one control unit, the illumination slit in a scanning direction across the field of view; and detect, by the detector controlled by the at least one control unit, an illumination collected by the microscope objective, wherein;

the sample is moved in a same direction as the scanning direction or in a direction perpendicular to the scanning direction while the illumination slit is moved across the field of view by the scanning unit.

* * * * *